UNITED STATES PATENT OFFICE.

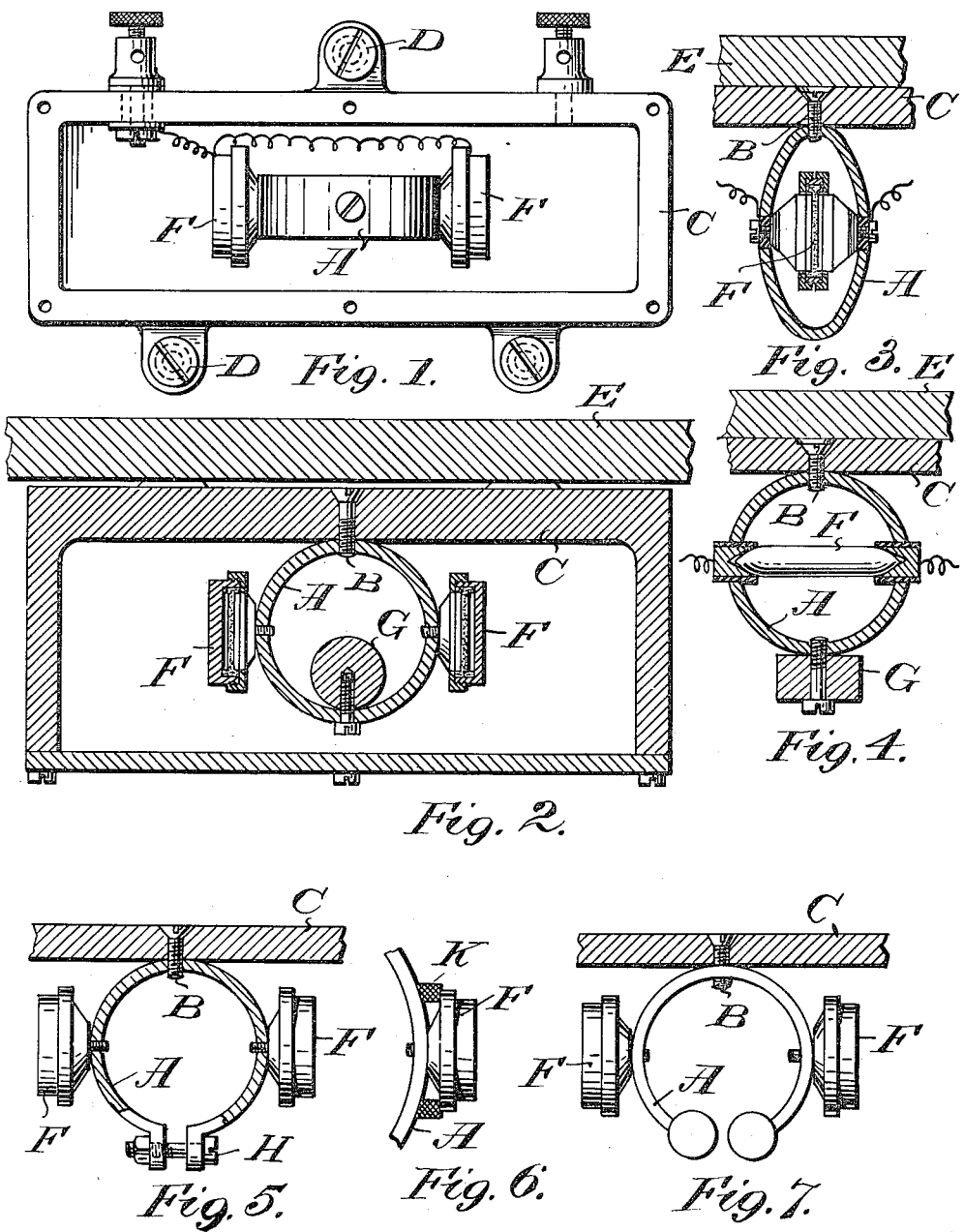

JOHN GARDNER, OF KNOTT END, NEAR FLEETWOOD, ENGLAND.

SOUND-RECEIVING APPARATUS USED IN SUBMARINE SOUND-SIGNALING.

1,129,565.  Specification of Letters Patent.  Patented Feb. 23, 1915.

Application filed December 27, 1909. Serial No. 534,933.

*To all whom it may concern:*

Be it known that I, JOHN GARDNER, a subject of the King of Great Britain and Ireland, and a resident of Knott End, near Fleetwood, in the county of Lancaster, England, have invented new and useful Improvements in Sound-Receiving Apparatus Used in Submarine Sound-Signaling, of which the following is a specification.

This invention relates to improvements in the microphonic appliances capable of use at a receiving station for receiving and transmitting submarine sound signals so that such signals may be heard in a telephonic receiver or like instrument or if desired so that such submarine sounds may upon their arrival at the receiving station give any desired signal or signals or initiate or effect any desired operation or operations.

The improved appliances comprise a vibratory circular or other loop, ring, or the like of metal or other suitable material which when used on shipboard is diametrically attached to or in contact with the face of the diaphragm which may be vibrated by the submarine or other sound vibrations. This diaphragm may be connected to or with or be directly thrown into vibration by the skin or wall of the ship when a ship is the receiving station, or it may itself be part of one of the plates of such ship, or any suitable form of diaphragm used in submarine sound signaling may be employed. The loop or ring must be of such dimensions and material and be so attached to the diaphragm that when lateral vibrations of the latter are set up a diameter of the ring rapidly increases and diminishes in length as a consequence of such vibrations and the inertia of that part of the loop or ring which is opposite to the point at which the ring is connected to the diaphragm. One at least of the electrodes of a microphone or telephonic transmitter included in a proper electric circuit containing a telephonic receiver or the like is attached to a suitable part of the ring or loop so as to be effected by the lateral vibrations of the diaphragm referred to, and preferably, and to get the best effect, the electrode is attached to one end of a diameter of the loop which is about parallel to the diaphragm and is itself about perpendicular to such diameter. In a moving receiving station such as a ship the diameter should point fore and aft and to get the best effect the ring should be disposed in about a horizontal plane.

If desired the two electrodes of a single transmitter, or two or more electrodes of two or more separate transmitters, may be disposed upon the ring in a proper manner to take advantage of the vibrations of such ring. The microphones or transmitters may be of any suitable type.

My invention will be understood by reference to the drawings in which—

Figures 1 to 7 show various forms of the improved ring or loop borne transmitter or microphone and their attachment to their diaphragms.

Referring first to Figs. 1 to 4—A is a vibratory metallic ring (for example brass) which is connected in the manner shown by the screw B to the sound receiving diaphragm. The diaphragm in this instance consists of a vibratory metallic casing C which is secured by the screws D to the inner surface of the plate E which is one of the underwater plates of a ship. At opposite ends of a diameter of the ring, conveniently a diameter which is about parallel to the plate E and is about horizontal, are the electrodes of a microphone or microphones F. When the diaphragm is laterally vibrated as on the arrival of submarine sound this diameter rapidly increases and diminishes in length owing to such vibrations and the inertia of that part of the ring which is opposite to the point of attachment to the casing or diaphragm. In the form shown in side elevation in Fig. 1 and in horizontal section in Fig. 2 there is a complete microphone or telephonic transmitter F of the known inertia type at each end of the diameter of the ring. These transmitters may be in parallel circuit with one another as shown in Fig. 1 (the circuit being completed through the metallic frame work) or may be connected in series. The two transmitters shown are simultaneously and similarly affected by the vibrations through and as a result of the single connection to the casing through the screw.

In the form shown in Fig. 3 the ring is not circular but is roughly oval and the electrodes which are connected to opposite ends of a diameter of the loop are electrodes of one and the same microphone F or transmitter which is contained within the loop or ring. In the modification shown in Fig.

4 the electrodes are mounted in the ring and they are connected with a carbon pencil, the ring in this case being circular.

The ring may be selective in action and only responsive to any great extent to the sound which is used for the signal which the appliance is to receive. Such selectivity may be effected if necessary by variably loading the ring opposite to its point of attachment to the diaphragm by a variable weight G, or, as is shown in Fig. 5, by dividing the ring or loop at a point which is opposite to the point of attachment to the diaphragm, and by joining the divided ends together by an adjustable straining or like screw H the strain of which may be varied.

If desired the divided ring described with reference to Fig. 5 may have its ends left unconnected as in Fig. 7.

The casing carrying the improved microphone appliance may be rigidly connected to the plate E as shown in Figs. 1 and 2, or may be otherwise secured thereto as thought best.

As is well known the proper sound vibrations arriving through water and impinging on a diaphragm of the nature indicated impart lateral vibrations to such plate, while local vibrations such as those set up by or in the engine room travel longitudinally along the plating of the ship. A microphone device of the described and illustrated construction and arrangement will exalt or magnify the proper submarine sound signals sent from a distance or will diminish the local vibrations or sounds or both, and will be affected only to the minimum extent by movements of the receiving station. To diminish the effect of vibrations of great amplitude an elastic or damping pad may be used in connection with the electrode or electrodes mounted on the ring or loop, and as shown in Fig. 6 by the india-rubber ring K. Further reduction of the effects of local vibration and sound may be secured by the insertion of an adjustable resistance in the microphone and telephonic receiver circuit. Enough resistance is put into the circuit to so diminish the sensitivity of the telephonic receiver as to just about extinguish therein the local noises. The strength of the desired signaling sounds is of course also diminished but not correspondingly so, as the telephonic receiver would have a diaphragm which has a natural period of vibration roughly corresponding with the vibratory periods of the sounds usually employed in submarine signaling. The variable resistance may be put in circuit to any extent according to local conditions or may be cut out altogether, as, for example, if the ship be stopped. Or the like effect of extinguishing any but the proper sounds may be achieved by reducing the sensitivity of the telephonic receiver by moving its diaphragm outwardly away from the position in which the best ordinary results are attained. This may be done by mounting the diaphragm in the case of an ordinary aural telephone in a screw cap and unscrewing the cap. Or packing of variable thicknesses may be placed below the diaphragm.

Although the improved microphonic appliances have been herein described chiefly as for ship work, they are of course equally applicable for other work and at other receiving stations.

I do not mean to limit my invention to the exact construction shown as other embodiments of my invention will occur to those skilled in the art. Moreover, its use is not limited to submarine signaling.

What I claim as my invention is:

1. A sound receiving and transmitting appliance, comprising in combination a diaphragm, a vibratory ring attached thereto portions of said ring opposite the point of attachment being adapted for vibration, and a microphone connected to and operated by such ring, all substantially as hereinbefore described.

2. A sound receiving and transmitting appliance comprising in combination a diaphragm, a vibratory ring attached thereto, and a microphone connected to and operated by said ring, all substantially as hereinbefore described.

3. A sound receiving and transmitting appliance, comprising in combination a diaphragm, a vibratory ring attached thereto, portions of said ring opposite the point of attachment being adapted for free vibration, and a plurality of microphones connected to and operated by such ring, substantially as hereinbefore described.

4. In a sound receiving and transmitting appliance, a diaphragm comprising a casing, a vibratory ring attached thereto, and a microphone connected to and operated by said ring.

5. A sound receiving and transmitting appliance, comprising in combination a diaphragm, a vibratory ring attached thereto and unsupported except at such point of attachment, and a microphone having two electrodes both of which are carried by such ring, all substantially as hereinbefore described.

6. A sound receiving and transmitting appliance, comprising in combination a diaphragm, a vibratory ring attached thereto and unsupported except at such point of attachment, and a plurality of microphones each having a plurality of electrodes, said electrodes being carried by such ring, all substantially as hereinbefore described.

7. A sound receiving and transmitting appliance comprising in combination a diaphragm, a vibratory ring attached thereto and unsupported except at such point of attachment, and a microphone having two electrodes both of which are carried by said ring, said microphone being adapted to form part of an electric circuit comprising a source of current and a telephone receiver whereby its action may be transmitted and received by said telephone receiver.

8. A sound receiving and transmitting appliance, comprising a diaphragm, a vibratory ring attached to said diaphragm, the plane of the ring being substantially normal to the surface of the diaphragm, a microphone connected to and operated by such ring, the point of attachment of the microphone to the ring being spaced from the point of attachment of the ring to the diaphragm by a distance substantially equal to one-quarter of the perimeter of the ring.

9. A sound receiving and transmitting appliance, comprising a diaphragm, a vibratory ring attached to said diaphragm, the plane of said ring being substantially normal to the surface of said diaphragm, a pair of microphones attached to said ring at opposite ends of a diameter thereof which is substantially parallel to the diaphragm, and means for mounting said diaphragm.

10. Sound receiving and transmitting apparatus, comprising in combination, a diaphragm, a vibratory ring attached thereto, and a microphone connected to and operated by said ring, said ring being tuned to vibrations of predetermined frequency.

11. Sound receiving and transmitting apparatus, comprising in combination, a diaphragm, a vibratory ring attached thereto, and a microphone connected to and operated by said ring, and means carried by said ring whereby said ring may be tuned to vibrations of predetermined frequency.

In witness whereof I have hereunto set my hand in the presence of two subscribing witnesses.

JOHN GARDNER.

Witnesses:
　WILLIAM GEO. HEYS,
　JOHN O'CONNELL.